(12) United States Patent
Marsh (10) Patent No.: US 7,725,256 B2
(45) Date of Patent: May 25, 2010

(54) WEATHER INFORMATION NETWORK ENABLED MOBILE SYSTEM (WINEMS)

(75) Inventor: Ronald Marsh, Grand Forks, ND (US)

(73) Assignee: The University of North Dakota, Grand Forks, ND (US)

( * ) Notice: Subject to any disclaimer, the term of this patent is extended or adjusted under 35 U.S.C. 154(b) by 794 days.

(21) Appl. No.: 10/629,183

(22) Filed: Jul. 29, 2003

(65) Prior Publication Data

US 2005/0027449 A1  Feb. 3, 2005

(51) Int. Cl.
  *G01C 21/00* (2006.01)
(52) U.S. Cl. .................. 701/213; 701/211; 340/995.13; 340/995.14; 455/404.1
(58) Field of Classification Search .................. 701/213, 701/208, 211; 340/905, 995.1, 995.12, 995.13, 340/995.14; 455/404.1, 404.2, 414.3
  See application file for complete search history.

(56) References Cited

U.S. PATENT DOCUMENTS

| | | | |
|---|---|---|---|
| 5,717,589 A | 2/1998 | Thompson et al. | |
| 5,867,122 A | 2/1999 | Zahm et al. | |
| 5,898,680 A * | 4/1999 | Johnstone et al. | 370/316 |
| 5,940,776 A | 8/1999 | Baron et al. | |
| 6,018,699 A | 1/2000 | Baron, Sr. et al. | |
| 6,112,074 A * | 8/2000 | Pinder | 455/404.2 |
| 6,125,328 A | 9/2000 | Baron et al. | |
| 6,163,756 A | 12/2000 | Baron et al. | |
| 6,188,960 B1 | 2/2001 | Baron et al. | |
| 6,266,063 B1 | 7/2001 | Baron et al. | |
| 6,272,433 B2 | 8/2001 | Baron et al. | |
| 6,275,774 B1 | 8/2001 | Baron, Sr. et al. | |
| 6,278,947 B1 | 8/2001 | Baron et al. | |
| 6,297,766 B1 * | 10/2001 | Koeller | 342/357.06 |
| 6,314,370 B1 * | 11/2001 | Curtright | 701/213 |
| 6,351,218 B1 | 2/2002 | Smith | |
| 6,356,843 B1 | 3/2002 | Baron et al. | |
| 6,384,830 B2 | 5/2002 | Baron et al. | |
| 6,401,039 B1 | 6/2002 | Baron et al. | |
| 6,405,134 B1 | 6/2002 | Smith et al. | |
| 6,490,525 B2 | 12/2002 | Baron, Sr. et al. | |
| 6,493,633 B2 | 12/2002 | Baron, Sr. et al. | |
| 6,501,392 B2 * | 12/2002 | Gremmert et al. | 340/971 |
| 6,526,268 B1 * | 2/2003 | Marrah et al. | 455/186.1 |
| 6,535,164 B2 * | 3/2003 | Imazeki et al. | 342/357.17 |
| 6,542,825 B2 | 4/2003 | Jones et al. | |
| 6,553,215 B1 * | 4/2003 | Chung | 455/218 |
| 6,590,529 B2 | 7/2003 | Schwoegler | |
| 6,603,405 B2 | 8/2003 | Smith | |

(Continued)

OTHER PUBLICATIONS

FCC news release, "FCC Amends Emergency Alert System Rules, Includes Child Abduction Alerts", Feb. 26, 2002.*

(Continued)

*Primary Examiner*—Khoi Tran
*Assistant Examiner*—Brian J Broadhead
(74) *Attorney, Agent, or Firm*—Kinney & Lange, P.A.

(57) ABSTRACT

A Weather Information Network Enabled Mobile System for providing information to a user regarding an emergency event. The WINEMS system receives location data, such as from a GPS system, and correlates the location data with the emergency alert to display a map showing both a location of the WINEMS system and a location of the emergency event. Preferably, the locations are displayed on a digital map.

7 Claims, 8 Drawing Sheets

U.S. PATENT DOCUMENTS

| | | | |
|---|---|---|---|
| 6,617,964 B1* | 9/2003 | Lamb | 340/286.02 |
| 6,670,908 B2 | 12/2003 | Wilson et al. | |
| 6,728,522 B1* | 4/2004 | Marrah et al. | 455/179.1 |
| 6,753,784 B1 | 6/2004 | Sznaider et al. | |
| 6,785,551 B1* | 8/2004 | Richard | 455/456.1 |
| 2002/0067289 A1* | 6/2002 | Smith | 340/905 |
| 2002/0107947 A1* | 8/2002 | Moragne et al. | 709/223 |
| 2002/0140604 A1* | 10/2002 | Doi | 342/385 |
| 2003/0120426 A1 | 6/2003 | Baron, Sr. et al. | |
| 2003/0143974 A1* | 7/2003 | Navarro | 455/404 |
| 2003/0163251 A1* | 8/2003 | Obradovich et al. | 701/208 |
| 2003/0171870 A1* | 9/2003 | Gueziec | 701/202 |
| 2003/0193394 A1* | 10/2003 | Lamb | 340/539.28 |
| 2004/0010366 A1* | 1/2004 | Videtich | 701/210 |
| 2004/0048598 A1* | 3/2004 | Gagnon | 455/404.2 |
| 2004/0080430 A1* | 4/2004 | Videtich | 340/905 |
| 2004/0102197 A1* | 5/2004 | Dietz | 455/456.1 |
| 2004/0102895 A1* | 5/2004 | Thayer et al. | 701/200 |
| 2004/0128070 A1* | 7/2004 | Schmidt et al. | 701/211 |
| 2004/0180683 A1* | 9/2004 | Dennis et al. | 455/521 |
| 2004/0198389 A1* | 10/2004 | Alcock et al. | 455/456.1 |

OTHER PUBLICATIONS

A brochure entitled "Respond to Severe Weather with Agility and Insight," by Baron, dated Sep. 2003.

A news release entitled "XM Radio and Weather Works to Launch Breath-Through Real-Time Weather Data Service for Aviation, Marine and Emergency Management," dated Apr. 7, 2003 (contacts: chance Patterson or Kim Grantham).

A news release entitled "XM WX Weather™ In-Flight Data Service Selected by Rockwell Collins for Launch on Cessna Citation CJ3," dated Jul. 28, 2003 (contacts: Allen Goldberg and Roderick MacKenzie).

* cited by examiner

WEATHER INFORMATION NETWORK ENABLED MOBILE SYSTEM (WINEMS)

CROSS-REFERENCE TO RELATED APPLICATION(S)

None.

BACKGROUND OF THE INVENTION

The present invention relates to an on-the-go mobile warning system for warning a user of an emergency event. More specifically, the mobile warning system displays a location of the emergency event relative to the location of the user.

There are well known systems for distributing information relating to severe weather or other emergency situations. For instance, in the United States, the National Oceanic & Atmospheric Administration (NOAA), part of the Department of Commerce, provides NOAA Weather Radio (NWR). NWR is a nationwide network of radio stations broadcasting continuous weather information to a geographic area based on information from the closest National Weather Service office. NWR is capable of broadcasting National Weather Service warnings, watches, forecasts, and other weather hazard information 24-hours a day. NWR is also capable of broadcasting warnings and post-event information for all types of hazards, such as natural disasters including earthquakes and volcanoes, or environmental disasters, such as chemical releases or oil spills.

NWR requires a special radio receiver or scanner capable of picking up the signal broadcast by NWR. It is possible for an ordinary consumer to purchase a receiver capable of receiving the NWR alerts, often called a "weather radio." Such weather radios can be purchased at a variety of electronic merchants, and are often sold in boat and marine accessory businesses, due to their popularity in the marine community.

NWR includes more than 750 transmitters, covering all 50 states, and adjacent coastal waters, Puerto Rico, the U.S. Virgin Islands, aid the U.S. Pacific Territories. A weather radio can be programmed to receive information specific to the specific geographic location in which the listener lives, or in which the weather radio is located. To allow for this, the National Weather Service has developed a Specific Area Message Encoder (SAME) feature. After a consumer has bought a weather radio compatible with the NWR SAME system, the consumer must program his or her county, parish, or independent city into the weather radio. After doing so, the NWR receiver will then alert the consumer only of weather or other emergencies for the county or location programmed.

Programming the NWR receiver involves several steps. In particular, the consumer must know a six-digit SAME code number for the consumer's county or location of choice. This number must be obtained either via a 1-888 telephone number and voice menu, or online by navigating an extensive, eight column United States and Territories table. Thus, to program a weather radio so that it only receives the information desired, a consumer must be able to navigate a complex system of technical and geographic information.

Though some automobiles are equipped with radios capable of receiving NWR broadcasts, the NWR receiver is not particularly suited for long distance travel. In particular, the NWR receiver must be reprogrammed at each new county so that it is configured to receive the correct SAME signal. As such, the weather radio system is not very mobile or portable.

More specifically, the shortcomings of the weather radio system become apparent when one considers taking a cross-country trip. For instance, when driving through an unfamiliar state, a conventional or weather radio may notify a driver of a weather emergency, such as a tornado. The radio may likewise indicate the current location of the tornado, and may further indicate the direction in which the tornado is traveling. However, if the driver is unfamiliar with the geographic location through which the driver is passing, such broadcasted information may be of little use. For instance, a driver may be notified of tornado located two miles east of a given town. If the driver is unfamiliar with the geography and merely continues to travel along the highway, the driver may be surprised to encounter what is obviously the path of the tornado only five miles down the road.

Though there are other mobile systems, particularly made available for use in automobiles, such mobile systems remain inadequate to provide the amount of information possible from an NWR receiver. Some cars may be equipped with an on board emergency service which allows a driver to press a button and be connected to an operator. In such systems, nothing is broadcast to the driver of the automobile, and thus the driver is not notified of emergency situations in the area. Rather, the driver only has the capability of calling out, or connecting to a remote operator in cases of emergency or when seeking information about an emergency event.

Similarly, there are navigation systems available for cars and other vehicles, such as boats. Such navigation systems may be able to provide a driver or operator with information regarding the location of the vehicle. However, such navigation systems typically do not broadcast alerts to notify the driver or operator of severe weather or other dangerous or emergency situations.

Thus, there is a need in the art for a mobile system capable of connecting to a regional broadcast system, such as NWR SAME, to provide a portable emergency alert radio system. Further, there is a need in the art for a weather radio capable of automatically updating the radio receiver to receive SAME data as the radio travels across boundaries of such broadcast areas.

BRIEF SUMMARY OF THE INVENTION

The present invention is a Weather Information Network Enabled Mobile System. The mobile system warns the user of an emergency event, such as severe weather, acts of terrorism, prison breaks, chemical or biological hazards, and a variety of other emergency information. In addition, the mobile system displays the location of the user relative to the emergency event.

To do so, the system comprises a radio system for receiving emergency alerts. One such suitable radio system is a weather radio receiver from the NWR. The mobile system further comprises a global positioning system receiver for determining the location of the mobile system, a satellite receiver for receiving digital data, such as a weather radar map, and a computer processor. The computer processor contains software which then process the data and displays a map showing a location of the emergency event, as well as the location of the user relative to the emergency event.

An additional feature of the present invention is the ability of the computer processor to automatically program the radio system for receiving alerts based on input from the global positioning system. In this manner, the mobile system is continuously updated as the mobile system travels so that it receives only the alerts for the geographic area in which it is currently located.

DETAILED DESCRIPTION

Figure 1A:
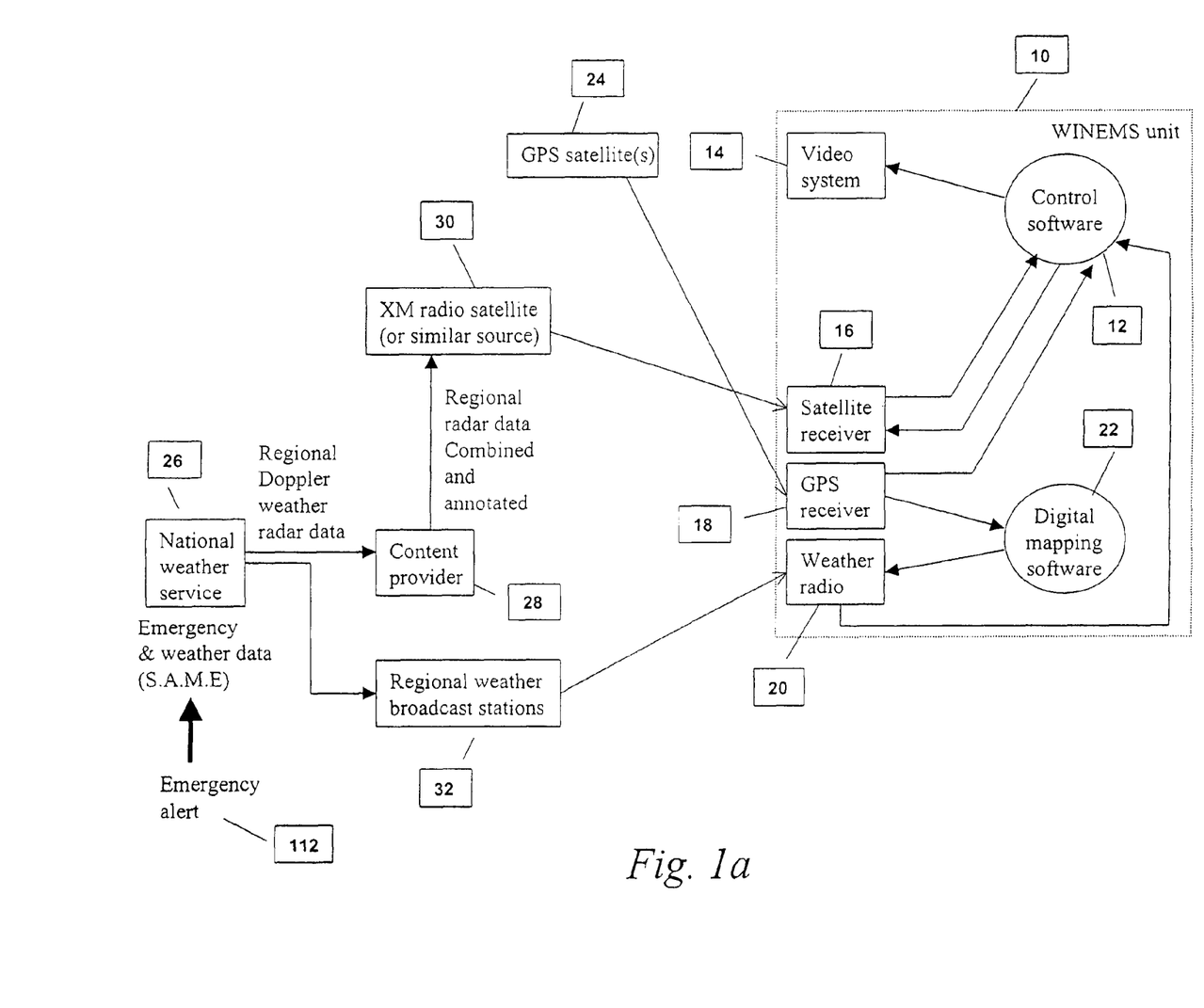
FIG. 1a is a block diagram of a Weather Information Network Enabled Mobile System.

FIG. 1a is a block diagram of a Weather Information Network Enabled Mobile System (WINEMS). As viewed in FIG. 1a, the WINEMS system comprises a WINEMS unit 10 configured to receive data (e.g., an emergency alert 112) from outside sources. The WINEMS unit 10 comprises control software 12, a display system 14, a satellite receiver 16, a GPS receiver 18, a weather radio 20, and digital mapping software 22. The outside source of data of the WINEMS system comprises a GPS satellite 24, a national emergency notification source 26, an optional content provider 28, and a satellite radio source 30. The WINEMS system further comprises regional broadcast stations 32.

The WINEMS unit 10 corresponds to the "head unit" and is small enough to be easily integrated into a vehicle, such as by mounting it on the dash of an automobile. Though the following discussion focuses on a WINEMS unit 10 configured for use in an automobile, the present invention is not so limited. In addition to use in a car, the WINEMS unit 10 may to be incorporated into a boat, portable handheld device, portable digital assistant, or other similar portable system.

The WINEMS unit 10 operates using the control software 12 and digital mapping software 22. The digital mapping software 22 is connected to the GPS receiver 18, which provides location data to the mapping software 22. The digital mapping software 22 is also connected to the weather radio 20. This allows the weather radio 20 to receive information from the digital mapping software 22 relating to the location of the mobile WINEMS unit 10. Based on the location information provided by the digital mapping software 22, the weather radio 20 can ensure it receives information relevant to the geographic location in which the radio 20 is located.

The weather radio 20 is also connected to the control software 12. In addition, the control software 12 is configured to receive an input from the satellite receiver 16 and the GPS receiver 18. The control software 12 connects to a display system 14, and after processing the information from the satellite receiver 16, GPS receiver 18, and weather radio 20, provides a visual output to the display system 14.

As illustrated by the arrows in FIG. 1a, the WINEMS unit 10 receives input from external sources as well. The national emergency notification system 26 is used to distribute a variety of emergency information. In the United States, a preferred source of the national emergency notification system 26 is the National Weather Service. The National Weather Service 26 runs NOAA weather radio (NWR), a nationwide network of radio stations broadcasting continuous weather information direct from a nearby National Weather Service office. The National Weather Service 26 also provides regional Doppler weather radar data. According to the invention, this weather radar data would be provided to the satellite radio 30, for broadcast to the satellite receiver 16 of the WINEMS unit 10. A content provider 28 may optionally improve this radar image from the National Weather Service 26 before sending the data to the satellite radio 30 for broadcast.

Specifically, the content provider 28 may perform certain "value added" processing of the raw digital radar data. For instance, most consumers would not recognize a funnel cloud indicated on a Doppler weather radar screen. As such, the content provider 28 may process the Doppler weather radar data received from the National Weather Service 26 by adding a funnel cloud icon 124 on the radar picture (See FIG. 3b). Other similar such value added processing maybe performed, such as adding icons for hail storms, blizzards, toxic waste spills, and much more. Once the weather radar data has optionally been processed for value added features, the radar data is supplied to a broadcaster, such as the satellite radio 30.

The satellite radio 30 then broadcasts the value added radar data so that the satellite receiver 16 can receive the data. Preferably, the satellite receiver 16 is capable of receiving a digital signal, such that it can receive the value added digital weather data as modified by the optional content provider 28.

Figure 1B:
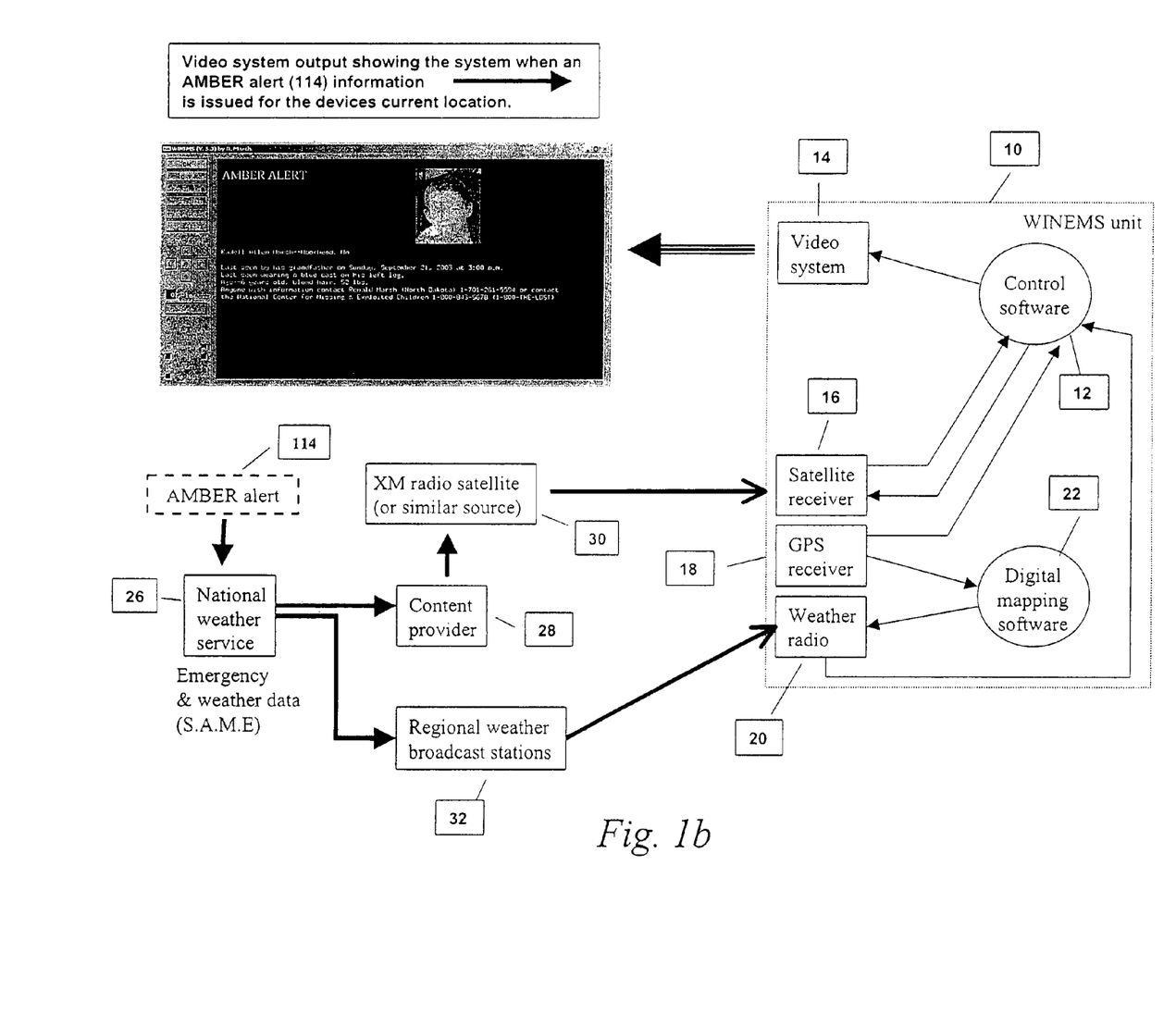
FIG. 1b is a block diagram of another Weather Information Network Enabled Mobile System.
Figure 1C:
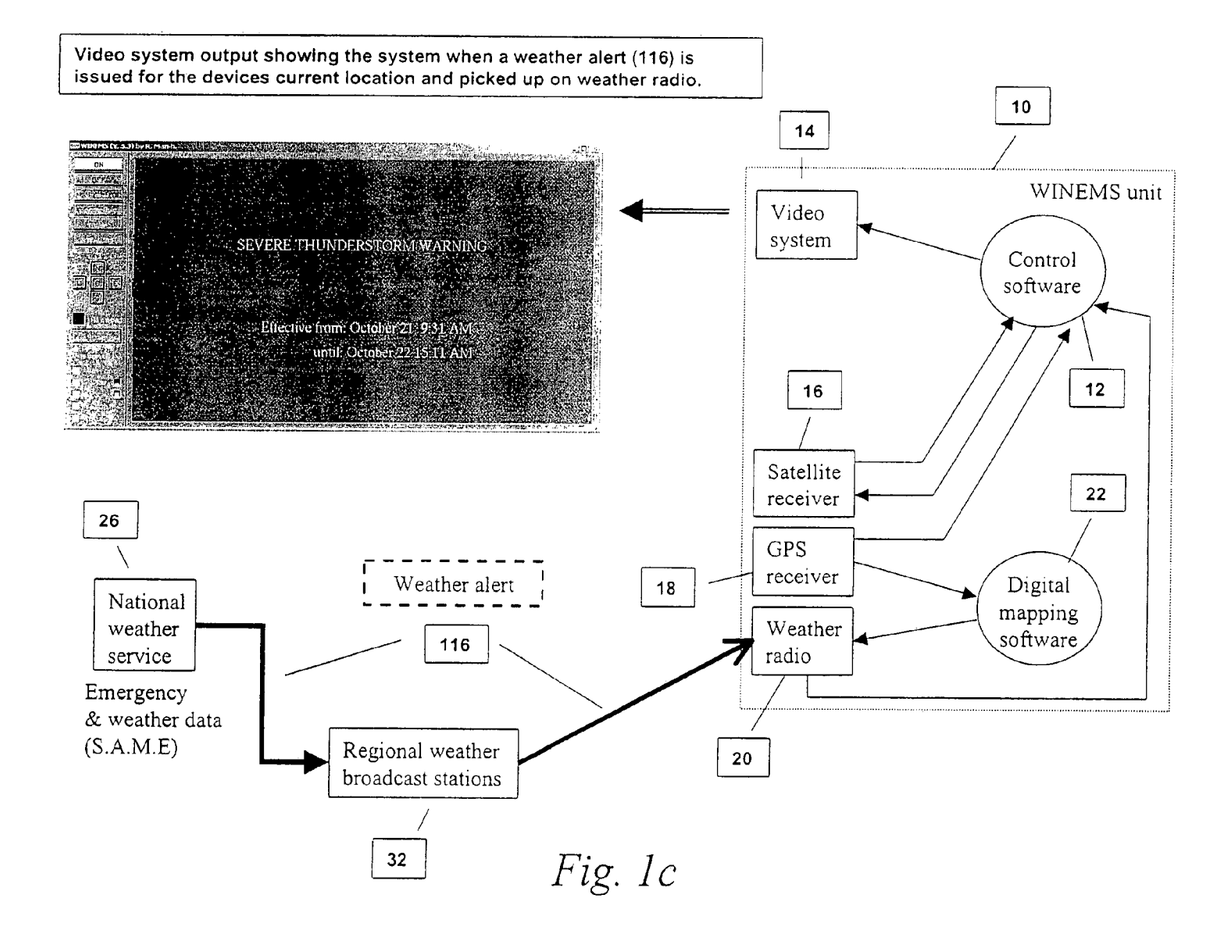
FIG. 1c is a block diagram of another Weather Information Network Enabled Mobile System.

In addition to weather radar data, the National Weather Service 26 disseminates other information via radio through a network of regional broadcast stations 32. Such information may include notification of severe weather 116 (See FIG. 1c), chemical spills, prison breaks, child abductions, and other threats to persons or property. When the National Weather Service 26 broadcasts a warning through one of its regional weather broadcast stations 32, it does so using a Specific Area Message Encoding (SAME) code. The SAME code provides information specific to the geographic area in which the regional broadcast station 32 is located. The weather radio 20 programmed to receive the SAME message will turn on for that message and the listener will hear a warning alarm tone as an attention signal, followed by a broadcast message.

The SAME code may be heard as a very brief static burst, depending on the characteristics of the receiving weather radio 20. The SAME code contains the type of message, counties affected, and a message expiration time. Additionally, a voice message may be broadcast, describing the hazard, the area affected, and the valid time period of the hazard. The voice message may include other details, such as storm movement, damage reports, or specific locations of greatest danger. At the end of the broadcast message, a listener will hear a brief end of message static burst followed by a resumption of the NWR broadcast cycle.

To receive the appropriate SAME code from the regional weather broadcast station 32, the weather radio 20 must be programmed for the county, parish, or independent city in which the radio is located. After being so programmed, the weather radio 20 will then alert a listener only of the weather and other emergencies for the county, parish, or independent city so programmed. Weather radios 20 without a SAME capacity will alert for emergencies anywhere within the coverage area of the closest NWR transmitter, which typically may be several counties, even though the emergency could be located geographically remote from the listener.

Many weather radio receivers 20 can be set to a muted or standby mode, such that the radio 20 will turn on only when the alerting message is received. Upon activation, some models of weather radios 20 may have a flashing light or other visual attention signal. Programming the radio 20 for the county SAME codes for the county or counties the listener wishes to be alerted for, eliminates unwanted alerts for counties in the coverage area that are not of concern to the listener.

The GPS receiver 18 is configured to receive global positioning information from a GPS satellite 24. Such GPS systems have become well known in the art. The GPS receiver 18 may further be configured with mapping software 22 which allows the GPS receiver 18 to correlate positioning data received from the GPS satellite 24 to detailed maps of the geographic locale in which the GPS receiver 18 is located. Such mapping software is known in the art, and may be detailed enough to show roads, county lines, bodies of water, such as rivers and lakes, and a variety of other geographic data.

Figure 2A:
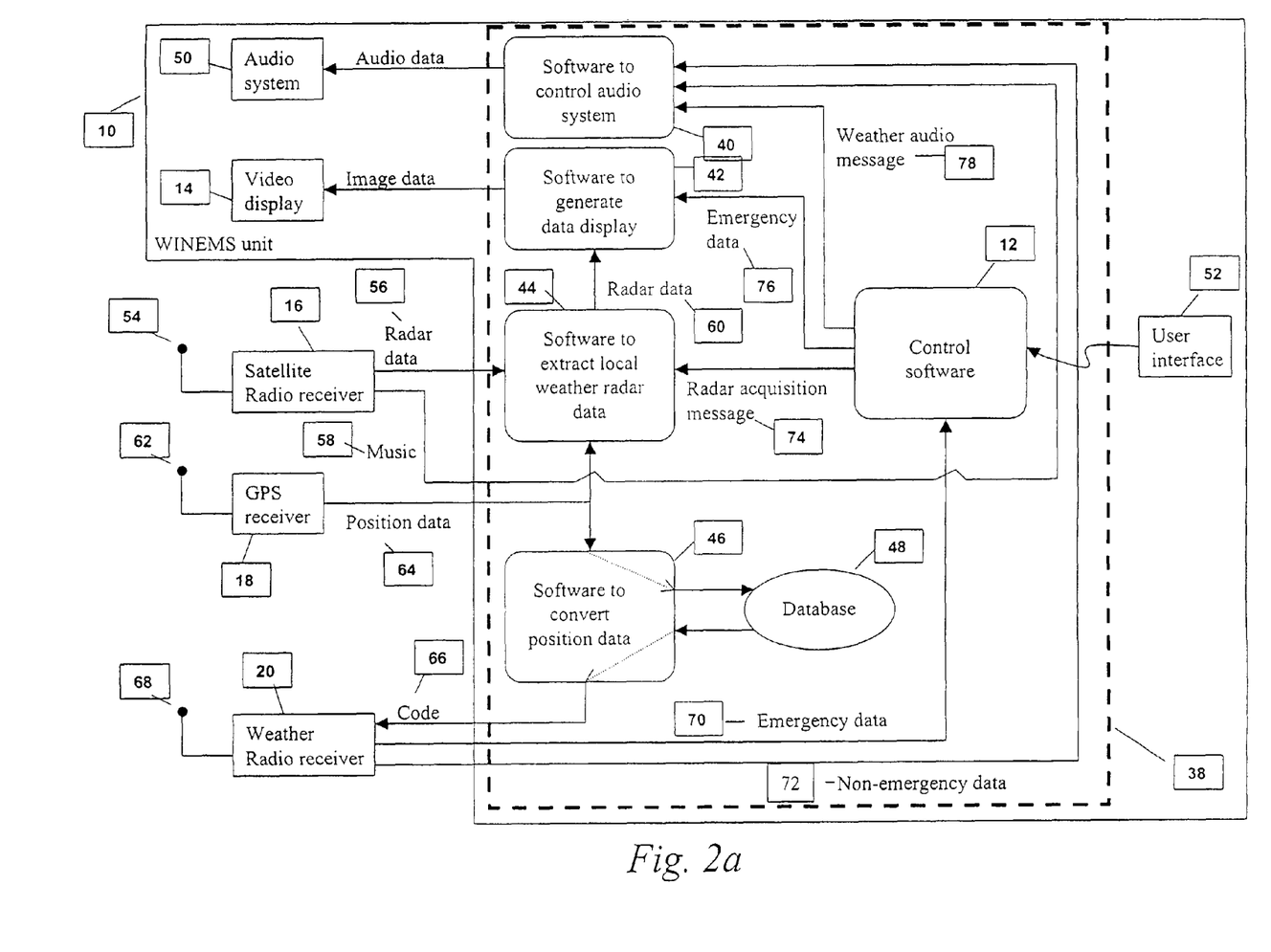
FIG. 2a is a more detailed block diagram showing data flow of the Weather Information Network Enabled Mobile System.

FIG. 2a is a more detailed diagram showing the data flow of the WINEMS unit 10 during active use. Shown in FIG. 2a is the control software 12, video display 14, satellite receiver 16, GPS receiver 18, and weather radio receiver 20. A computer processor 38 is used to operate the control software, and is indicated generally by a rectangle 38. One example of a suitable processor 38 is the Auto PC made by Clarion Corporation. The Auto PC is an in-dash personal computer capable of running the Windows® operating system and outputting to a color display.

Included in the control software 12 are several subroutines, including audio software 40 for controlling an audio system, display software 42 to generate a data display, local weather radar extraction software 44 to extract local weather radar data, and automatic FIPS code programming software 46 to convert position data to FIPS code data. The computer processor 38 further comprises a database of FIPS locations 48. Also shown in FIG. 2a is an audio system 50 and a user interface 52.

The satellite radio receiver 16 receives a signal 54 from a satellite radio source. The signal 54 may be in the form of radar data 56 or music 58. The satellite radio receiver 16 provides the music signal 58 to the audio software 40, where the music signal can be output to the audio system 50. The satellite radio receiver 16 provides radar data 56 to the local weather radar extraction software routine 44, which processes the radar data 56 to obtain processed radar data 60. The processed radar data 60 is supplied to the display software 42, which uses the processed radar data 60 to generate display data to be output on the video display 14.

The GPS receiver 18 receives a GPS signal 62 from a GPS signal 62 source. From the GPS signal 62, the GPS receiver 18 obtains position data 64. The position data 64 is supplied to the local weather radar extraction software routine 44. One option for the local weather radar extraction software routine 44 is to use the position data 64 to extract the appropriate local radar data based on the position data 64. Thus, the processed radar data 60 comprises only the radar data 56 for the geographic location in which the WINEMS unit 10 is located.

The GPS receiver 18 also provides position data 64 to an automatic FIPS code programming software routine 46 for converting the position data 64 to FIPS code data 66. A FIPS code refers to the federal information processing standards number given to identify geographic areas of the United States. When automatically programming the weather radio, the automatic FIPS code programming software routine 46 uses the position data 64 in connection with a database of FIPS locations 48 to obtain the correct FIPS code data 66. The FIPS code data 66 automatically programs the weather radio 20 to insure that the weather radio 20 is receiving data only for the geographic location of interest. The FIPS code data, as well as more details on how such automatic programing of the weather radio 20 can be implemented, are given in FIG. 4 below.

Once the weather radio 20 is properly programmed based on the FIPS code data 66, the weather radio 20 receives a weather broadcast 68 from a weather broadcast source, such as the Regional Weather Service's NWR broadcast. Upon receipt of a weather broadcast 68, the weather radio 20 obtains emergency data 70 or non-emergency data 72. The non-emergency data 72, such as voice weather reports, is input to the audio software 40 which controls the audio system 50. In this way, non-emergency data 72 can optionally be played through the audio system 50. If the weather radio 20 receives emergency data 70, the weather radio 20 sends this emergency data 70 to the control software 12.

In the event that the weather radio 20 receives emergency data 70, the system functions as follows. The weather radio receiver 20 sends the emergency data 70 to the control software 12, which activates the WINEMS system. The control software 12 then sends an activate radar acquisition signal 74 to the local weather radar extracting software routine 44. The local weather radar extracting software routine 44 obtains radar data 56 from the satellite receiver 16. At the same time, position data 64 is obtained from the GPS receiver. Based on the position information from the GPS receiver 18, the local weather radar extracting software routine 44 extracts only the local weather radar data. This processed radar data 60 is provided to the display software for display on the video display 14.

The control software 12 also sends emergency data 76 received from the weather radio 20 to the display software routine 42. The display software routine 42 may use the emergency data 76 to generate the display for the video display 14, in addition to the processed radar data 60. The control software 12 further supplies an audio signal to the audio software 40, so that the audio portion of the emergency data 70 can be played through the audio system 50.

The display software 42 generates image data 80 which provides a visual indication of both the emergency and location of the user relative to that emergency. The image data 80 may be displayed in the form of a map. The map may further include the local radar data 60 obtained from the local weather radar extraction software 44 as a digital overlay on the location map. To further assist the user, the display 14 may also include certain icons on the image data 80 to identify the type of weather emergency. For instance, icons may be used to indicate the location of a tornado, hail, flash flood areas, or other weather emergency information on the local radar map.

The display 14 further includes an indication of the location of the user obtained from the GPS receiver 18. This location information of the WINEMS unit 10 may be displayed on the map in the form of an icon. Furthermore, it may be desirable to indicate whether or not the location of the WINEMS unit 10 is static or dynamic relative to the emergency event. For instance, if the WINEMS unit 10 is in a traveling vehicle, such as a boat or car, the icon indicating the position of the user may be in the form of an arrow in the direction the boat or car is traveling. If the WINEMS unit 10 is not moving, the location of the WINEMS unit 10 may simply be indicated on the map using any suitable icon.

In addition to the above, the WINEMS unit can be modified to function in non-emergency situations. For instance, the user interface 52 may also be used to configure the control software 12 to allow a user to listen to music 58 received via the satellite radio receiver 16. In this manner, the WINEMS unit can be set so that the audio system 50 merely plays music 58 received from the satellite radio receiver 16. In addition, the user interface 52 allows interaction with the control software 12 such that the control software 12 can request that the weather radio 20 play non-emergency data 72. In this manner, the control software 12 can insure that non-emergency data 72 such as voice weather information or other non-emergency broadcast weather information, is sent directly to the audio software 40 or play through the audio system 50.

It is also contemplated that the WINEMS system will allow a user to request the most recent radar data 56. To do so, the software 44 receives the radar data 56 from the satellite receiver 16. The software 44 can be used to process the radar data 56 to obtain either local, regional, or national radar maps depending on the user's choice as indicated through user interface 52. The software 44 then provides this processed radar data 60 to the display software 42 for display on the video display 14. Finally, the user interface 52 may be used to set the WINEMS unit on "standby." When operating on standby, the WINEMS unit becomes operational, and output is provided to the audio system 50 and/or video display 14, only after the weather radio receiver 20 has received an emergency data signal 70.

Figure 3A:
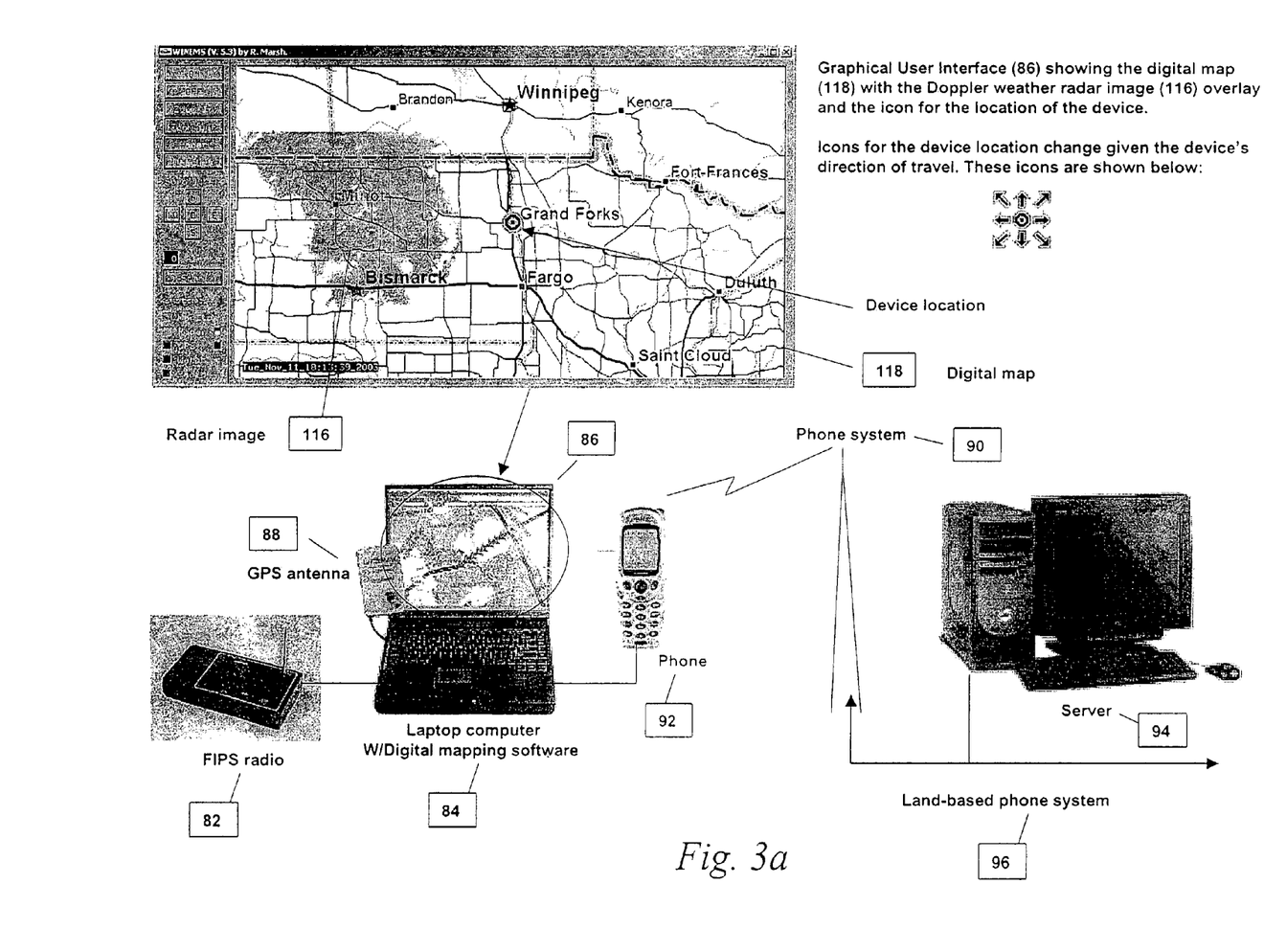
FIG. 3a is a diagram showing the hardware for use in a Weather Information Network Enabled Mobile System with an exploded view of a graphical user interface.
Figure 3B:
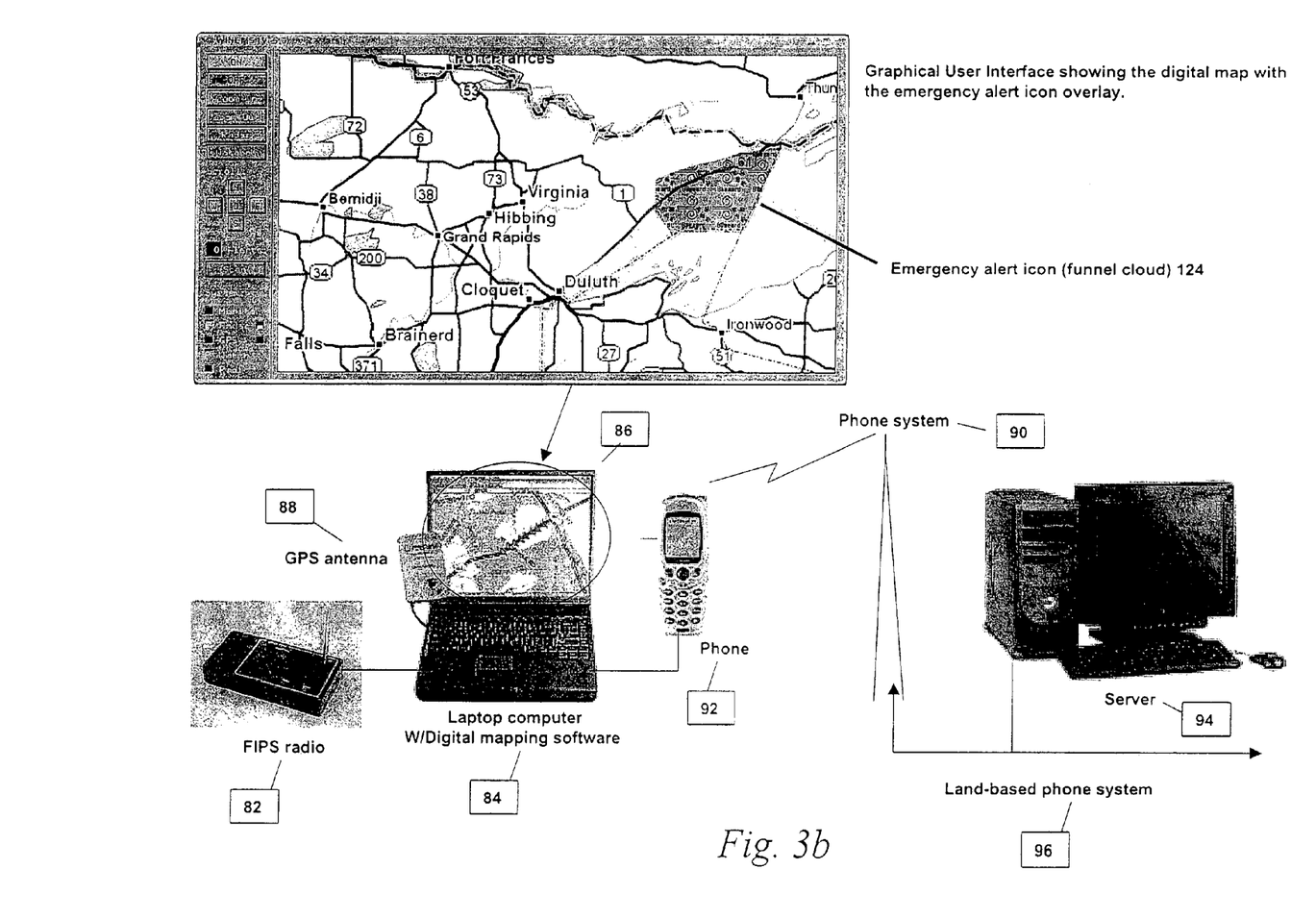
FIG. 3b is a diagram showing the hardware for use in a Weather Information Network Enabled Mobile System with another exploded view of the graphical user interface.

FIG. 3 shows an alternate view of a WINEMS system 80. The alternate system 80 comprises a weather radio 82, a laptop computer 84 having digital mapping software 86, and a GPS receiver 88. The WINEMS unit 80 further comprises a cell phone system 90 comprising the cell phone 92 and a computer server 94 connected to a land-based phone system 96.

In operation, the cell phone based WINEMS system 80 functions similarly to the satellite based system described with reference to FIGS. 1 and 2. However, as shown in FIG. 3, the cell phone 92 connects to the server 94 to obtain radar maps, rather than using a satellite radio system as a source of the radar data.

In operation, the cell phone based WINEMS system 80 functions as follows. When the weather radio 82 receives an emergency alert 112, the radio 82 communicates the emergency alert 112 to the laptop 84. The laptop 84 contains a GPS system 88 for obtaining location data, as well as mapping software 86 for displaying digital maps 118. The laptop 84 is also connected to a cell phone 92. The cell phone 92 calls a computer server 94 via a cell phone system 90. The cell phone system 90 may optionally be connected to a land-based phone system 96 for connecting to the server 94. The server 94 contains current radar data, such as that available over the Internet. The current radar data is then transmitted back to the computer 84 via the land phone system 96 and cell phone system 90.

The cell phone 90 inputs the current radar data to the computer 84, which then processes the radar data, the information from the weather radio 82, and location data from the GPS system 88. The computer 84 then displays the location map 118 with a digital overlay of the weather radar 116. This radar picture 116 and digital map 118 indicates the location of the emergency events, as well as the location of the WINEMS unit relative to the emergency event.

Figure 4:
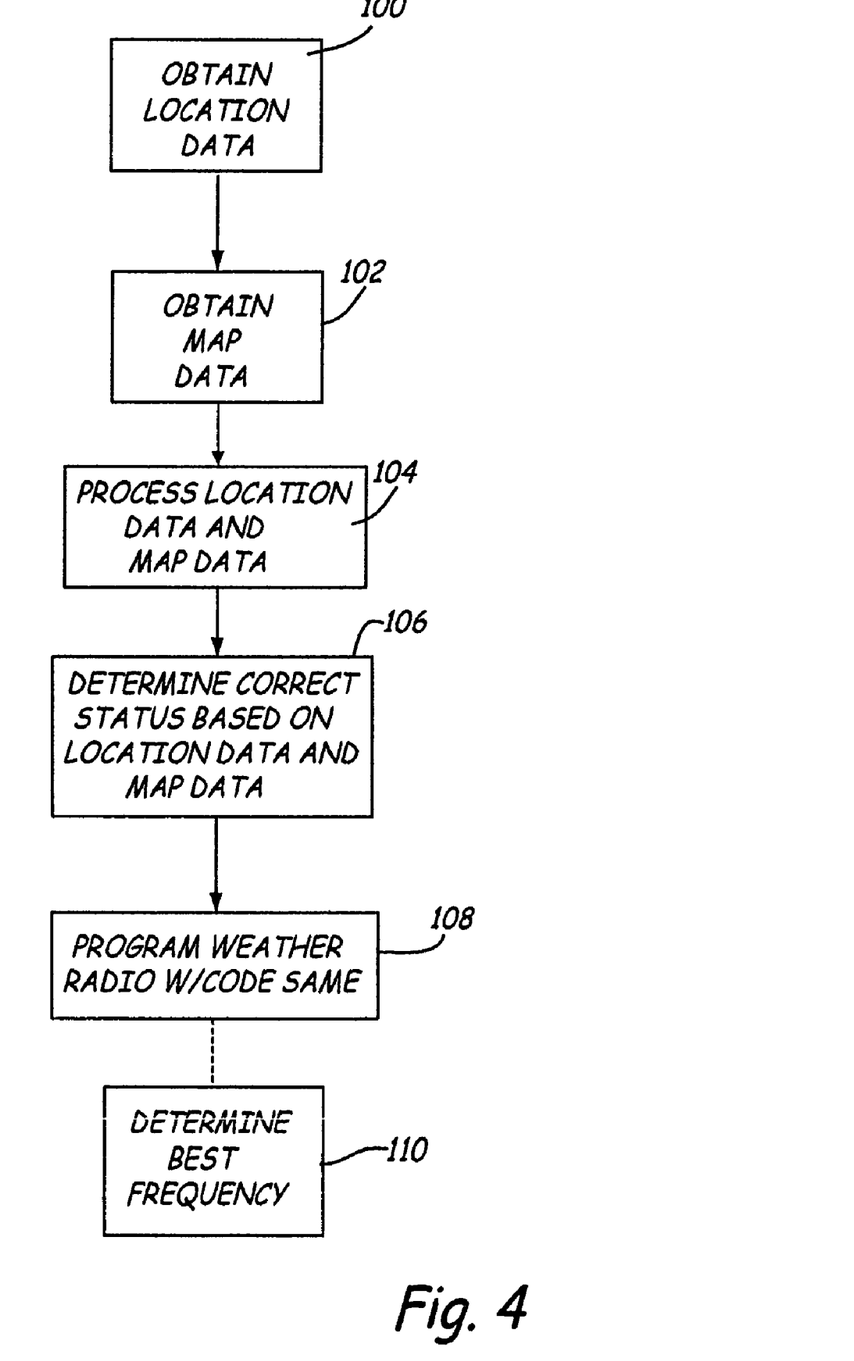
FIG. 4 is a flow diagram illustrating a method of automatically programming a weather radio with a SAME code.

FIG. 4 is a flow diagram illustrating a method of automatically programming a weather radio to receive the appropriate SAME code by programming the weather radio with the appropriate FIPS code. Once programmed with the correct six-digit FIPS code number, the radio will alert the listener only of the weather and other emergencies for the county programmed. The first step in automatically programming the weather radio is to obtain location data 100. Obtaining location data of the weather radio may preferably be done using a global positioning system.

The next step 102 is to obtain map data. Obtaining map data may be done using any of a variety of widely available software packages, including those supplied with many GPS systems. The third step 104 is to process the location data and map data. In the fourth step 106, the correct SAME code is determined based on the processed location and map data. The last step 108 is to program the weather radio with the correct FIPS code.

The processing and determination steps 104, 106 can be conducted in a variety of computer programming options known in the art. For instance, when obtaining location data, a GPS system may give a location of the radio based on the latitude and longitude of the radio. The mapping software can then coordinate the latitude and longitude description of the location of the radio to determine in which county the weather radio is located. Once the GPS data and mapping software are used to locate a position of the radio on the map, it is a simple matter to look up the correct FIPS code for the radio using a database containing the correct FIPS code for each county in the broadcast area.

Figure 2B:
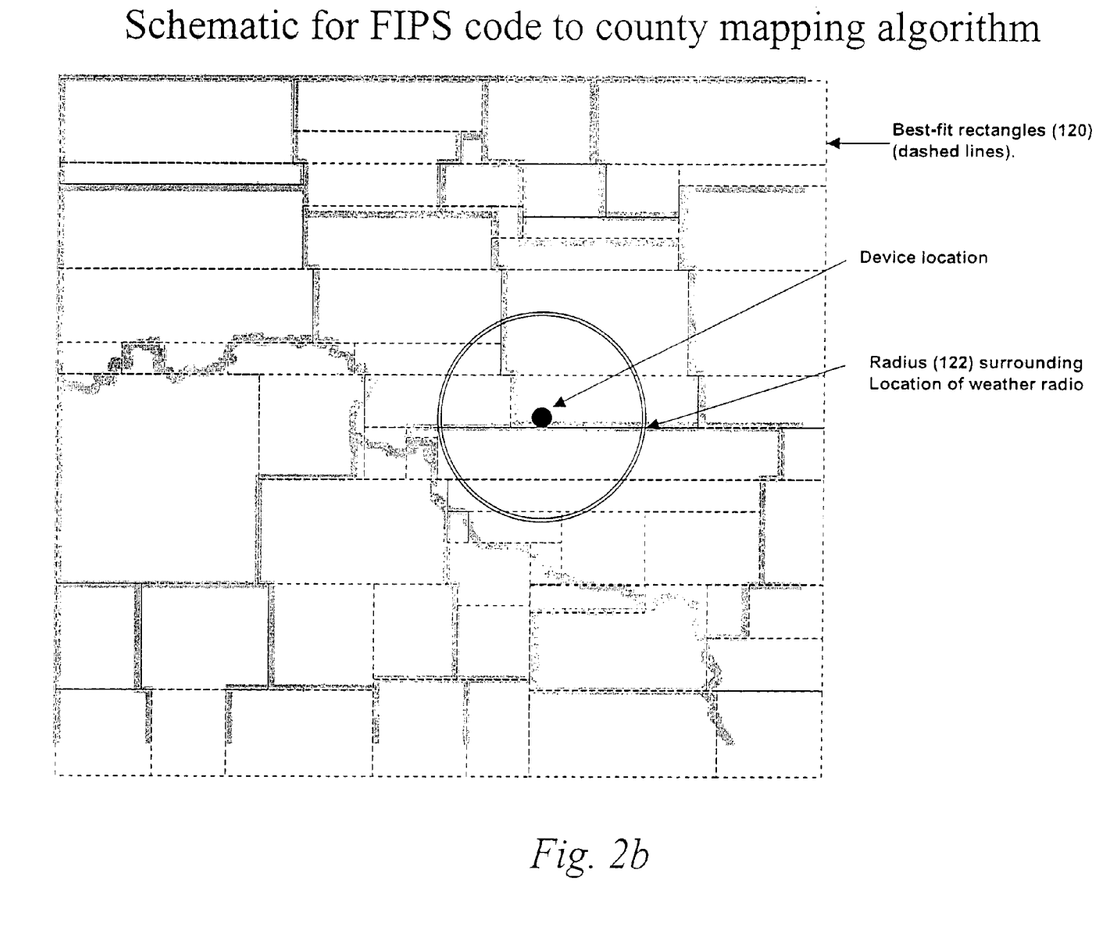
FIG. 2b is a schematic representation of a location processing algorithm of the Weather Information Network Enabled Mobile System.

Alternatively, the GPS data can be used to locate a position of the radio on the map, and processing can be done to determine within a certain radius 122 of the location on the map the relevant county in which the radio is located (See FIG. 2b). Yet another option is to use a best-fit rectangle 120 model to define the county, and based on the location data from the GPS system, determine whether the radio is in the county or not.

An optional step 110 is to further include the ability to likewise determine the best frequency available to the weather radio based on the location of the weather radio. The ability to determine the best frequency may be based on a similar database, made available from the National Weather Service, showing parts of a geographic area that have good reception and parts which do not. Furthermore, it may be possible to implement a scanner capable of scanning the available frequencies of the SAME broadcasts and automatically choosing the frequency of the strongest transmitter.

Though discussed in terms of using an SAME code to alert a user of a severe weather event, the invention is not so limited. For instance, the invention is contemplated for use with such public service alerts as the AMBER alert 114, which notifies the public of missing children. In such an instance, the system would be capable of broadcasting the alert, and broadcasting a location of the disappearance of the child, as well as a digital photographic image of the child (See FIG. 1b). Furthermore, the system may likewise be configured to use more than just data available from the National Weather Service, and can be modified to include data from a residence state, county, or even city.

Although the present invention has been described with reference to preferred embodiments, workers skilled in the art will recognize that changes may be made in form and detail without departing from the spirit and scope of the invention.

The invention claimed is:

1. A portable alert system for receiving emergency event data, the portable alert system comprising:
   a radio receiver for receiving emergency event data;
   a global positioning system receiver for determining a location of the portable alert system;
   a satellite receiver for receiving digital data;

a computer processor disposed within the portable alert system; and control software utilized by the computer processor for processing the emergency event data and an input from the global positioning system to provide an output to a display indicating a position of the portable alert system and a position of an emergency, wherein the computer processor further utilizes the control software to process the input from the global positioning system receiver to automatically program the radio receiver to receive only an emergency data broadcast data signal associated with the location of the portable alert system, and wherein the computer processor further utilizes the control software to simultaneously process the emergency event data from the radio receiver and the digital data from the satellite receiver.

2. The portable alert system of claim 1 wherein the digital data received by the satellite receiver comprises digital radar data.

3. The portable alert system of claim 1, wherein the emergency data broadcast data signal is associated with a specified analog broadcast frequency.

4. The portable alert system of claim 1, wherein the digital data comprises emergency event data.

5. A portable alert system for receiving emergency event data, the portable alert system comprising:

a radio receiver for receiving emergency event data;

a global positioning system receiver for determining a location of the portable alert system;

a cellular phone system for receiving digital data;

a computer processor disposed within the portable alert system; and control software utilized by the computer processor for processing the emergency event data and an input from the global positioning system to provide an output to a display indicating a position of the portable alert system and a position of an emergency, wherein the computer processor further utilizes the control software to process the input from the global positioning system receiver to automatically program the radio receiver to receive only an emergency data broadcast data signal associated with the location of the portable alert system, and wherein the computer processor further utilizes the control software to simultaneously process the emergency event data from the radio receiver and the digital data from the cellular phone system.

6. The portable alert system of claim 5, wherein the emergency data broadcast data signal is associated with a specified analog broadcast frequency.

7. The portable alert system of claim 5, wherein the digital data comprises emergency event data.

* * * * *

UNITED STATES PATENT AND TRADEMARK OFFICE
CERTIFICATE OF CORRECTION

| | | |
|---|---|---|
| PATENT NO. | : 7,725,256 B2 | Page 1 of 1 |
| APPLICATION NO. | : 10/629183 | |
| DATED | : May 25, 2010 | |
| INVENTOR(S) | : Ronald Marsh | |

It is certified that error appears in the above-identified patent and that said Letters Patent is hereby corrected as shown below:

Col. 1, Line 40
  Delete "aid"
  Insert --and--

Col. 4, Line 25
  Delete "maybe"
  Insert --may be--

Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

PATENT NO. : 7,725,256 B2
APPLICATION NO. : 10/629183
DATED : May 25, 2010
INVENTOR(S) : Ronald Marsh It is certified that error appears in the above-identified patent and that said Letters Patent is hereby corrected as shown below:

In the Specification

Col. 1, line 8: insert the following between the Cross-Reference to Related Application(s) and the Background of the Invention:

-- STATEMENT REGARDING FEDERALLY SPONSORED RESEARCH

The U.S. Government has a paid-up license in this invention and the right in limited circumstances to require the patent owner to license others on reasonable terms as provided for by the terms of contract No. DMI 0232966 awarded by the National Science Foundation. --

Signed and Sealed this
Tenth Day of December, 2013

Margaret A. Focarino
*Commissioner for Patents of the United States Patent and Trademark Office*